Dec. 11, 1956     J. R. OISHEI     2,773,353
WINDOW OPERATING OR ACCESSORY SYSTEM
Filed May 18, 1953
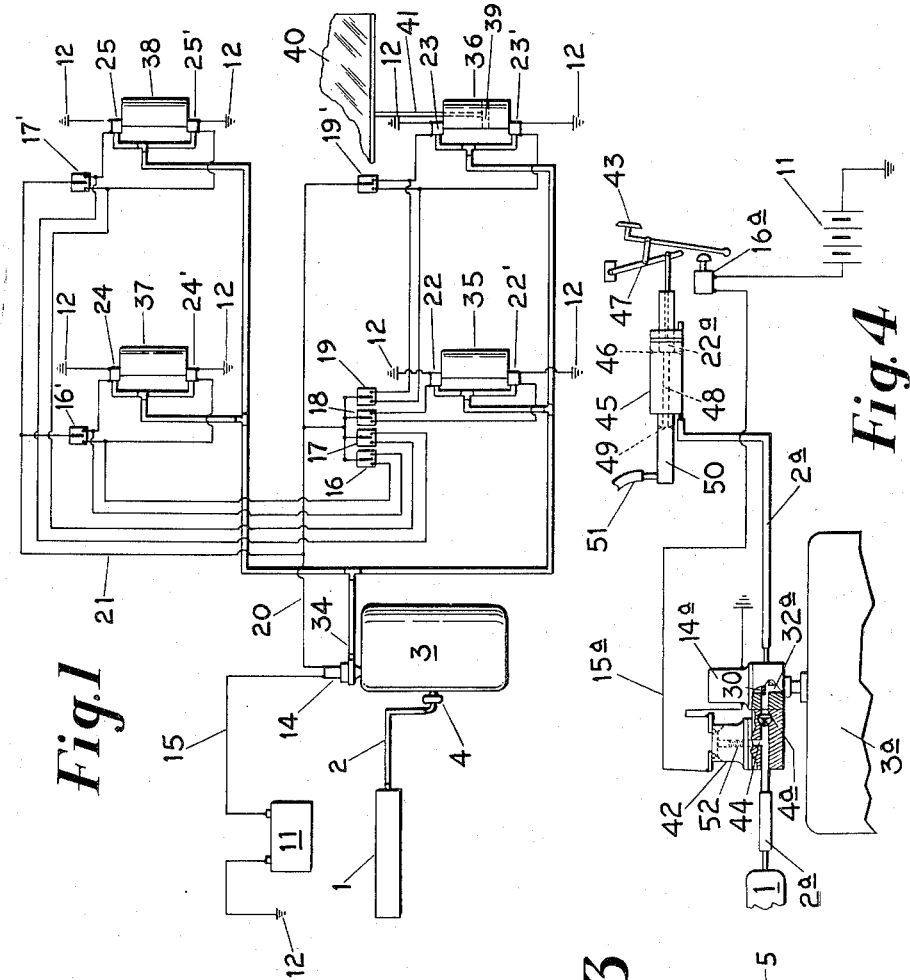
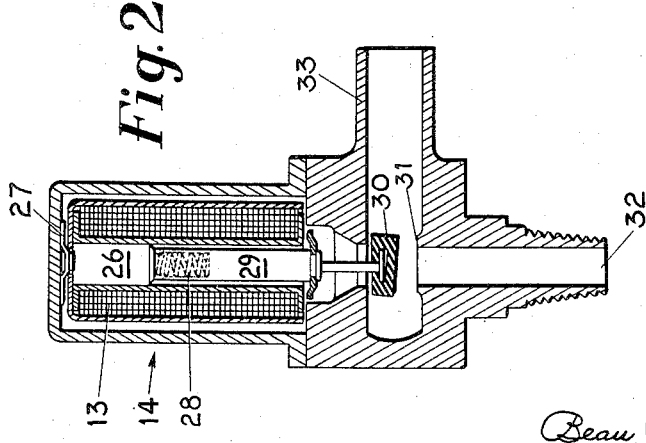
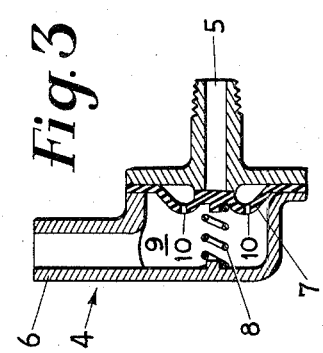
INVENTOR.
John R. Oishei
BY
Bean, Brooks, Buckley & Bean,
ATTORNEYS.

United States Patent Office 2,773,353
Patented Dec. 11, 1956

2,773,353

WINDOW OPERATING OR ACCESSORY SYSTEM

John R. Oishei, Buffalo, N. Y., assignor to Trico Products Corporation, Buffalo, N. Y.

Application May 18, 1953, Serial No. 355,473

14 Claims. (Cl. 60—60)

This invention relates to the pneumatic system conventionally employed to operate automotive accessories, such as vacuum brakes and window lifts, and more particularly to a system wherein a source of high vacuum is available for the intermittent operation of the above mentioned accessories.

The pneumatic system normally requires one or more pneumatic motors, a two-way valve system arranged to evacuate one side or the other of a selected one of the pneumatic motors for movement of the piston contained therein, and a series of conduits and couplings for the passage of air. The piston in turn is connected to the accessory, which term includes the brake and the window, for its movement upon activation of the piston. The intake manifold of the vehicle's engine provides an economical source of power. However, as the vacuum existent in the manifold is of a fluctuating magnitude, the suction provided thereby is not always sufficient to properly operate the accessory, nor is it available when the engine is not operative. Additional means have been proposed to provide auxiliary power when the manifold vacuum is low or absent, such as an electrically driven pump which involves added expense. It has also been proposed to employ a reservoir to preserve an available supply of suction for use during periods of manifold insufficiency or failure. However, because of the multiplicity of valves and couplings in the pneumatic system, a distinct hazard of parasitic leakage exists. The leakage would bleed air into the reservoir of auxiliary power, vitiating its usefulness.

In commercial installations it has been found impractical to keep all of these parasitic leakage possibilities to a low enough level so as to retain the reservoir vacuum storage for any appreciable time.

According to the illustrated embodiment of the instant invention, a reservoir is used for the purpose of storing the auxiliary power and is normally sealed off from the remainder of the pneumatic system. A spring pressed valve is interposed between the intake manifold and the reservoir to hermetically seal the latter against flow thereinto from the manifold. When the vacuum in the manifold is of sufficient magnitude to create a predetermined pressure differential across the valve, it opens against the resistance of the spring, permitting evacuation of the reservoir by the manifold. A second spring pressed valve hermetically sealing the reservoir is interposed between it and the accessory or accessories. A solenoid is provided to open the second valve against the resistance of its spring when it is desired to utilize one or more of the accessories. The second valve is common to the plural accessory system, but is independent of their control valves which are selectively operable, the arrangement being such that when any of the accessory control valves is opened, the second reservoir sealing valve will likewise be opened for the actuation of the selected accessory. Except when the manifold vacuum is high or the accessories are being utilized, the reservoir will be hermetically sealed, insuring against the bleeding of air thereinto if a leak exists in any part of the pneumatic system. This permits the maintenance of a high vacuum in the reservoir for indefinite periods of time without appreciable dissipation.

Accordingly, it is an object of this invention to provide a pneumatic system wherein a high vacuum is continually available to the accessories for instant use.

It is an additional object of this invention to provide a pneumatic system wherein a vacuum of high magnitude may be maintained without dissipation for prolonged periods of time.

For a better understanding of these and other objects of the invention, reference is made to the following specifications and accompanying drawings, wherein:

Fig. 1 diagrammatically represents a pneumatic system constructed in accordance with the instant invention;

Fig. 2 is an elevational view in section of the reservoir sealing inlet valve;

Fig. 3 is an elevational view in section of the check valve; and,

Fig. 4 is a schematic view showing a further application of the improved accessory system.

Referring now more particularly to the drawings, the numeral 1 designates the intake manifold of the vehicle's engine, which is connected by conduit 2 to reservoir or tank 3. Check valve 4 is interposed between the conduit and the reservoir with a port thereof in communication with the interior of the reservoir while conduit 2 is attached to nipple 6. Valve 7 is normally held securely against its seat by spring 8, and by the force of the pressure differential on its area inside of port 5, thereby effectively sealing off port 5, and therefore the interior of the reservoir from conduit 2. Preferably, outlet valve 7 is in the form of a soft rubber diaphragm clamped at its periphery between sections of the valve housing and having the spring 8 acting upon a central portion of the diaphragm to press it upon its seat. Chamber 9 of the check valve is, however, in constant communication with the intake manifold and the pressure therein is substantially that of the manifold. If the vacuum in the intake manifold is sufficiently high while that in the tank is more nearly atmospheric, a pressure differential will exist across valve 7, tending to lift the valve off its seat. When this differential reaches a predetermined magnitude, the valve will lift from its seat against the resistance of the spring, interconnecting the interior of the reservoir and the manifold via orifices 10 in the valve. Air will therefore be evacuated from the reservoir by the manifold via port 5, orifices 10, nipple 6 and conduit 2. When the pressure differential thereacross diminishes the valve will again be seated under the urging of the spring, hermetically sealing the reservoir.

The numeral 11 designates an automobile battery of conventional design, one side of which is grounded at 12. The other side of the battery is connected to coil 13 of the reservoir sealing inlet valve 14, best seen in Fig. 2, by lead 15 and thence to the manually operated window lift switches 16, 17, 18, 19 and 16', 17' and 19' by leads 20 and 21. The switches in turn are connected respectively to one side of the solenoid operated window lift valves 22, 22', 23, 23', 24, 24', 25 and 25'. The opposite sides of the window lift valves are connected to ground 12, completing the circuit back to the battery. Thus it will be seen that whenever one of the switches 16, 17, 18 or 19, or 16', 17' or 19' is closed a circuit will be established with the operating coil 13 of valve 14 in series with the operating coil on the corresponding one of the window lift valves 22, 22', etc., providing simultaneous operation of the valve 14 and one of the window lift valves. The arrangement is such that the operator of the vehicle may raise or lower any of the windows by manipulating the appropriate one of switches 16–19, while the passengers may independently raise or lower the window proximate to their position in the vehicle by manipulating the switches 16', 17' or 19'.

Referring now more particularly to Fig. 2, the stationary part 26 of the solenoid core is an abutment that is press fit into the central bore of the reservoir sealing inlet valve 14, and also is positively held against relative movement by leaf spring 27. Helical spring 28 seated in a bore provided therefor in armature 29 abuts the undersurface of abutment 26, urging the armature downward so that valve 30 is normally in firm engagement with its seat 31, effectively sealing port 32 which opens into reservoir 3. Nipple 33 is connected to conduit 34, which leads to valves 22, 22', 23, 23', 24, 24', 25 and 25' of automatic window lifts 35, 36, 37 and 38. The valves may be similar in design to the reservoir sealing inlet valve 14.

Assuming it is desired to change the position of one of the windows, the left front window as an example, the operator closes switch 18. This completes a circuit from the battery 11, through lead 15, coil 13 of the reservoir sealing inlet valve 14, lead 20, switch 18, and the selected one of valves 22 and 22', depending upon whether it is desired to raise or lower the window, ground 12 and battery 11. When the circuit is closed, armature 29 is drawn up into the solenoid against the resistance of spring 28 which compresses against stationary abutment 26. As the armature rises, it lifts valve 30 off its seat 31 opening port 32 and reservoir 3. It should be noted that valve 30 and the undercut portion thereof by which it is attached to the armature, are of trapezoidal rather than rectangular shape. This results in a peeling action of the valve off its seat as the armature is raised, requiring considerably less force than if a rectangular shape had been employed. Simultaneously, electrically operated valve 22 or 22', depending upon whether it is desired to raise or lower the window, is opened, placing window lift 35 in communication with reservoir 3 and the vacuum existent in the reservoir is made available for operation of the window. Each window lift has a fluid motor consisting generally of a piston 39 operating in a cylinder or chamber and connected to a respective window 40 by the piston rod 41 or other transmission. Only one window has been shown and this diagrammatically. For a more detailed disclosure of the operation of the window lift, reference is made to Patent No. 2,369,797, issued to Anton Rappl of Buffalo, N. Y. on February 20, 1945 for a Window Operator.

After the window has been moved to the desired position, the operator releases switch 18, breaking the circuit. This results in the two solenoid valves moving back to their normal position, and reservoir 3 is again sealed off from the remainder of the pneumatic system with its branched conduits. If the vacuum in the reservoir has been dissipated to any appreciable extent by air flowing from the window lift during the operation thereof, such air will be evacuated from the reservoir by the intake manifold as explained above. It may thus be seen that by employing the instant invention, a vacuum of considerable magnitude may be maintained for prolonged periods without appreciable dissipation, and be continuously available for the proper actuation of the intermittently operated pneumatically powered automotive accessories. Since the vacuous condition in the reservoir may be indefinitely maintained over periods of disuse of the vehicle it will be obvious that a window previously left open may be closed at any time without restarting the engine. Should the power plant of the vehicle embody an engine driven pump, the latter may constitute the primary source of suction, in lieu of, or in cooperation with, the intake manifold.

Fig. 4 depicts another accessory or part of an automobile in the form of a vacuum brake system wherein a suction responsive diaphragm switch 42 is interposed in the suction line 2a between the intake manifold 1 and the reservoir sealing inlet valve 14a, such switch being in circuit with the electrical source 11 and a manual switch 16a which latter is designed to be closed when the brake pedal 43 is depressed. The suction line 2a opens through a branch passage 44 into the diaphragm switch while the main line continues on through a check valve 4a and through the casing of the sealing inlet valve 14a to the vacuum motor 45 of the brake system. Its piston 46 is connected by a play connection through the linkage 47 to the pedal and by a rod 48 to a fluid displacing member 49 of the hydraulic brake master cylinder 50 from which a conduit 51 extends to the individual brake motor units. The sealing inlet valve 14a communicates with the reservoir 3a through a passage 32a at the brake side of the check valve 4a, the latter serving to preserve the reservoir supply of negative pressure whenever the manifold influence is less than a predetermined value.

When applying the brakes, the actuation of the pedal will open its conventional valve 22a of approved design through the suction line 2a directly to the manifold, providing its suction influence is above a predetermined value, at which time the diaphragm switch remains opened and the sealing valve remains closed. Should the manifold influence be less than the said predetermined value, the diaphragm switch will be closed and the solenoid 13 will be energized as soon as the circuit 15a is closed by manual switch 16a, the check valve 4a closing to prevent dissipation of the reservoir supply. The diaphragm of the switch 42 is backed by a spring 52 of a preset value for controlling the pressure response of the diaphragm in its actuation of the switch. In this embodiment, the accessory control valve 22a is manually operable concurrently, or substantially concurrently, with the sealing valve 14a whenever the reservoir supply is opened to the accessory. To again evacuate the reservoir the valve 30 will serve in the capacity of a check valve by lifting off its seat 31 against the tension of its spring 28.

Having thus disclosed an exemplary embodiment thereof, what I claim as my invention is:

1. An accessory system for automotive vehicles, comprising in combination with a source of fluctuating suction, a fluid motor having a normally closed operational control valve, a suction line connecting the source to the motor, a reservoir having a normally closed inlet valve and a self-closing outlet valve interposed in the suction line between the source and the motor, the suction line beyond the reservoir being sealed off by said inlet valve to prevent the leakage of air into the reservoir, and a selector for simultaneously opening both normally closed valves.

2. A pneumatic system for operating an accessory of a motor vehicle, comprising a reservoir having a normally closed inlet valve and a self-closing outlet valve, the latter being connectible to a source of operating pressure, a plurality of fluid actuated accessories each having a normally closed operational control valve, branched conduits connecting the plural operational control valves to the normally closed inlet valve, and means operatively connecting the inlet valve selectively to any of the operational control valves for opening concurrently with the latter.

3. In a fluid pressure accessory system for automotive vehicles, an accessory having a fluid motor, a reservoir of power, a control valve for the motor, an inlet valve for the reservoir, a suction line connecting the two valves, said suction line being subject to the possibility of atmospheric leakage, means to simultaneously open both valves so as to intercommunicate the motor and reservoir, and further means to automatically replenish the reservoir.

4. In a fluid operated accessory system having a source of fluctuating suction, a reservoir, a self-closing outlet valve between the reservoir and the source, and electrically operated inlet valve between the accessory and the reservoir, means to activate and deactivate the accessory, and further means for opening and closing the inlet valve substantially simultaneously with the actuation of the means for activating and deactivating the accessory.

5. An accessory system for automotive vehicles, comprising in combination with a source of fluctuating suction, a fluid motor having an outlet valve, a suction line interconnecting the source and the motor, a reservoir interposed between the source and the motor in the suction line, an inlet valve and an outlet valve for said reservoir, that portion of the suction line between the motor outlet valve and the reservoir inlet valve being partially vented to atmospheric pressure by parasitic leakage thereinto, and means for substantially simultaneously opening and closing the motor outlet valve and reservoir inlet valve.

6. An accessory system for automotive vehicles, comprising in combination with a source of suction, a fluid motor, a reservoir, a suction line interconnecting the reservoir and fluid motor, said suction line being normally subject to parasitic leakage of atmospheric air thereinto, a normally closed outlet valve between the motor and suction line, a normally closed inlet valve between the suction line and reservoir, means for automatically opening and closing said outlet and inlet valves substantially simultaneously, and further means operative upon the existence of a predetermined pressure differential between the reservoir and said source of suction for placing them in communication with one another.

7. A fluid accessory system for automotive vehicles comprising in combination, a source of suction, an accessory having a fluid motor with a forward stroke and a rearward stroke, said motor having a normally closed operational control valve, a suction line connecting the source to the motor, a reservoir interposed in the suction line and having normally closed inlet and outlet valves, said outlet valve opening automatically upon the existence of a predetermined pressure differential thereacross, that part of the suction line between the directional control valve and the inlet valve being subject to parasitic leakage thereinto, and means for simultaneously opening and closing said directional control valve and inlet valve of the reservoir.

8. A fluid pressure accessory system for automotive vehicles, comprising in combination with a source of fluctuating suction, a reservoir, a first suction line interconnecting the source and reservoir, a normally closed outlet valve between the reservoir and said first suction line, said valve opening automatically upon the existence of a predetermined pressure differential thereacross, a fluid motor having a forward stroke and a rearward stroke, a second suction line interconnecting the fluid motor and reservoir, an operational control valve between the fluid motor and second suction line, said operational control valve and second suction line being subject to parasitic leakage thereinto, a normally closed inlet valve sealing off the reservoir from the second suction line and preventing the leakage of the air into the reservoir, and selector means for simultaneously opening and closing said inlet valve and operational control valve.

9. In a fluid pressure accessory system for automotive vehicles, an accessory having a fluid motor, an operating valve for the fluid motor, a first conduit connected to the intake manifold of the vehicle's power plant, a reservoir connected to said first conduit, a check valve interposed between said first conduit and the reservoir, said valve including spring pressed means operating automatically when the vacuum in the intake manifold is higher than the vacuum in said reservoir, a second conduit leading from the reservoir to said motor, a second valve mounted on the reservoir sealing off the second conduit and the motor from the reservoir, said second valve including spring pressed means and independent power means, said power means operating to open said second valve to withdraw air from the motor for the operation thereof, and a unified manual control means to simultaneously actuate said power means and open the operating valve on the motor.

10. A pneumatic system for operating a window of a motor vehicle, comprising a reservoir having a normally closed inlet valve and a self-closing outlet valve, the latter being connectible to a source of operating pressure, a plurality of fluid actuated accessories each having a normally closed directional control valve, branched conduits connecting the plural directional control valves to the normally closed inlet valve, and means automatically associating the operation of the inlet valve with any of the directional control valves in accordance with the selective control means used.

11. In a fluid operated accessory system having a source of fluctuating suction, a reservoir, a self-closing outlet valve between the reservoir and the source, an electrically operated inlet valve between the accessory and the reservoir, means to activate and deactivate the accessory and further means for opening and closing said inlet valve automatically upon actuation of the means for activating and deactivating the accessory.

12. An accessory system for automotive vehicles, comprising in combination with a source of fluctuating suction, a fluid motor having a normally closed operational control valve, a suction line connecting the source to the motor, a reservoir having a normally closed inlet valve and a self-closing outlet valve interposed in the suction line between the source and the motor, the suction line at the accessory side of the reservoir being sealed off by said inlet valve to prevent the leakage of air into the reservoir, a selector for simultaneously opening both normally closed valves, and means operable in response to a suction of predetermined value at the source to remove the inlet valve from the control of the selector.

13. An accessory system for automotive vehicles comprising in combination with a source of fluctuating suction, a fluid motor having an operational control valve, a suction line connecting the source to the motor, a reservoir having an inlet valve and an outlet valve interposed in the suction line between the source and the motor, and a selector for substantially simultaneously actuating the operational control valve and the reservoir inlet valve.

14. An accessory system for automotive vehicles comprising in combination with a source of fluctuating suction, a fluid motor having an operational control valve, a suction line connecting the source to the motor, a reservoir having an inlet valve interposed in the suction line between the source and the motor, said inlet valve opening by a peeling action when actuated, and a selector for substantially simultaneouely actuating the operational control valve and the reservoir inlet valve.

References Cited in the file of this patent

UNITED STATES PATENTS

| | | |
|---|---|---|
| 1,296,735 | Arbuckle | Mar. 11, 1919 |
| 1,653,985 | Campbell | Dec. 27, 1927 |
| 2,336,808 | Simon | Dec. 14, 1943 |
| 2,512,286 | Oishei | June 20, 1950 |

FOREIGN PATENTS

| | | |
|---|---|---|
| 168,315 | Switzerland | June 16, 1934 |